(12) United States Patent
Takahashi (10) Patent No.: US 10,363,964 B2
(45) Date of Patent: Jul. 30, 2019

(54) STAY DROP-OFF STRUCTURE IN CASE OF IMPACT LOAD INPUT

(71) Applicant: HONDA MOTOR CO., LTD., Tokyo (JP)

(72) Inventor: Toshiya Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 15/852,990

(22) Filed: Dec. 22, 2017

(65) Prior Publication Data

US 2018/0178844 A1     Jun. 28, 2018

(30) Foreign Application Priority Data

Dec. 28, 2016   (JP) ................. 2016-256840

(51) Int. Cl.
*B60J 7/00*      (2006.01)
*B62D 21/15*     (2006.01)

(52) U.S. Cl.
CPC .................... *B62D 21/15* (2013.01)

(58) Field of Classification Search
CPC ........ B62K 19/30; B62K 5/01; B60K 15/067; B60K 17/16; B62D 21/11; B62J 15/00; B62J 17/00; A47C 1/03294; B60R 19/24
USPC .............................. 296/187.09, 29
See application file for complete search history.

(56) References Cited

U.S. PATENT DOCUMENTS

| 3,347,501 | A | * | 10/1967 | Van Eimeren | ....... B60K 5/1241 180/232 |
| 4,770,234 | A | * | 9/1988 | Hiraoka | ................. B60K 11/04 165/67 |
| 4,796,841 | A | * | 1/1989 | Baker | ................. F01N 13/1822 248/60 |
| 5,476,151 | A | * | 12/1995 | Tsuchida | ................. B60K 1/00 180/274 |
| 6,260,609 | B1 | * | 7/2001 | Takahashi | .............. B60K 11/04 165/67 |
| 7,108,092 | B2 | * | 9/2006 | Suwa | ..................... B60K 11/04 180/68.4 |
| 8,636,438 | B2 | * | 1/2014 | Riekers | .................. B60K 13/04 403/220 |
| 9,604,672 | B2 | * | 3/2017 | Kaneko | .............. B62D 25/2027 |
| 9,944,123 | B2 | * | 4/2018 | Liu | ........................ B60B 35/163 |
| 2002/0140220 | A1 | * | 10/2002 | Tatsumi | ................... B60G 3/20 280/781 |

(Continued)

FOREIGN PATENT DOCUMENTS

JP         3954477 B2      8/2007

*Primary Examiner* — Kiran B Patel (74) *Attorney, Agent, or Firm* — Rankin, Hill & Clark LLP (57) ABSTRACT

A stay includes a first-bolt hole portion fastened to a body frame by a first bolt, a second-bolt hole portion fastened to a subframe by a second bolt, a recessed portion disposed between the first-bolt hole portion and the second-bolt hole portion and recessed downward, and a cutout portion continuous with the first-bolt hole portion and formed by cutting out a part of the recessed portion. The dimension of the recessed portion in its depth direction is equal to or larger than the dimension of the head portion of the first bolt in its height direction. The widthwise dimension of the cutout portion in a direction perpendicular to an axis of the stay is set to be smaller than the largest outer diameter of the head portion of the first bolt.

4 Claims, 7 Drawing Sheets

(56) References Cited

U.S. PATENT DOCUMENTS

| | | | | |
|---|---|---|---|---|
| 2009/0096253 | A1* | 4/2009 | Yatsuda | B62D 21/11 296/193.09 |
| 2013/0307301 | A1* | 11/2013 | Munemura | B60N 2/4228 297/216.13 |
| 2014/0021729 | A1* | 1/2014 | Kosaka | B60R 19/26 293/133 |
| 2015/0314807 | A1* | 11/2015 | Nusier | B62D 21/11 296/187.09 |
| 2016/0347368 | A1* | 12/2016 | Kawai | B62D 21/11 |
| 2017/0240128 | A1* | 8/2017 | Kashiwagi | B60R 11/00 |
| 2017/0313361 | A1* | 11/2017 | Watanabe | B62D 25/08 |
| 2018/0342718 | A1* | 11/2018 | Iacovoni | B60K 1/04 |

* cited by examiner

FIG. 7A
FIRST COMPARATIVE EXAMPLE

FIG. 7B
SECOND COMPARATIVE EXAMPLE

STAY DROP-OFF STRUCTURE IN CASE OF IMPACT LOAD INPUT

BACKGROUND OF THE INVENTION

1. Field of the Invention

The present invention relates to a stay drop-off structure for causing a stay to drop from a vehicle upon input of an impact load to the vehicle.

2. Description of the Related Art

Japanese Patent No. 3954477, for example, discloses a structure including a stay in which a slit and a bolt hole communicating with the slit are formed, and the stay is fastened to a mount bracket by a stud bolt inserted in the bolt hole.

In Japanese Patent No. 3954477, when an impact load is input into the vehicle, the stud bolt drops from the bolt hole through the slit, thereby allowing the stay to be separated from the mount bracket.

However, in the stay drop-off structure disclosed in Japanese Patent No. 3954477, the dimension of the slit in its width direction, which is substantially perpendicular to the direction of extension of the slit, is set to be substantially equal to the outer diametrical dimension of the threaded portion of the stud bolt. This means that in the case where the dimension of the slit in its width direction and the outer diametrical dimension of the threaded portion of the stud bolt are substantially equal, the stud bolt can be easily displaced from the bolt hole toward the slit if there is nothing to hold the stud bolt within the bolt hole.

For this reason, in Japanese Patent No. 3954477, the stud bolt may possibly be displaced through the slit from the bolt hole and let the stay drop in events other than input of an impact load to the vehicle such as decrease in the axial force fastening the stay and the mount bracket to each other due to loosening of the threaded portion of the stud bolt.

SUMMARY OF THE INVENTION

The present invention has been made in view of the above and makes it an object thereof to provide a stay drop-off structure in case of impact load input capable of reliably letting a stay drop upon input of an impact load while preventing the stay from dropping in events other than input of an impact load.

To achieve the above object, the present invention provides a stay drop-off structure in case of impact load input for causing a stay to drop from a first structure or a second structure of a vehicle upon input of an impact load into the vehicle, the first structure and the second structure being coupled to each other by the stay, in which the stay includes a first-bolt hole portion situated on one end side of the stay in an axial direction thereof and fastened to the first structure by a first bolt, a second-bolt hole portion situated on an opposite end side of the stay in the axial direction and fastened to the second structure by a second bolt, a recessed portion disposed between the first-bolt hole portion and the second-bolt hole portion and recessed downward, and a cutout portion being continuous with the first-bolt hole portion and formed by cutting out apart of the recessed portion, a dimension of the recessed portion in a depth direction thereof is equal to or larger than a dimension of a head portion of the first bolt in a height direction thereof, a widthwise dimension of the cutout portion in a direction perpendicular to an axis of the stay is set to be smaller than a largest outer diameter of the head portion of the first bolt, and the head portion of the first bolt is provided such that, when an impact load is input to the vehicle, the head portion of the first bolt is capable of passing through the cutout portion deformed by the input of the impact load and entering the recessed portion.

According to the present invention, it is possible to obtain a stay drop-off structure in case of impact load input capable of reliably letting a stay drop upon input of an impact load while preventing the stay from dropping in events other than input of an impact load.

DETAILED DESCRIPTION OF THE EMBODIMENT

Figure 1:
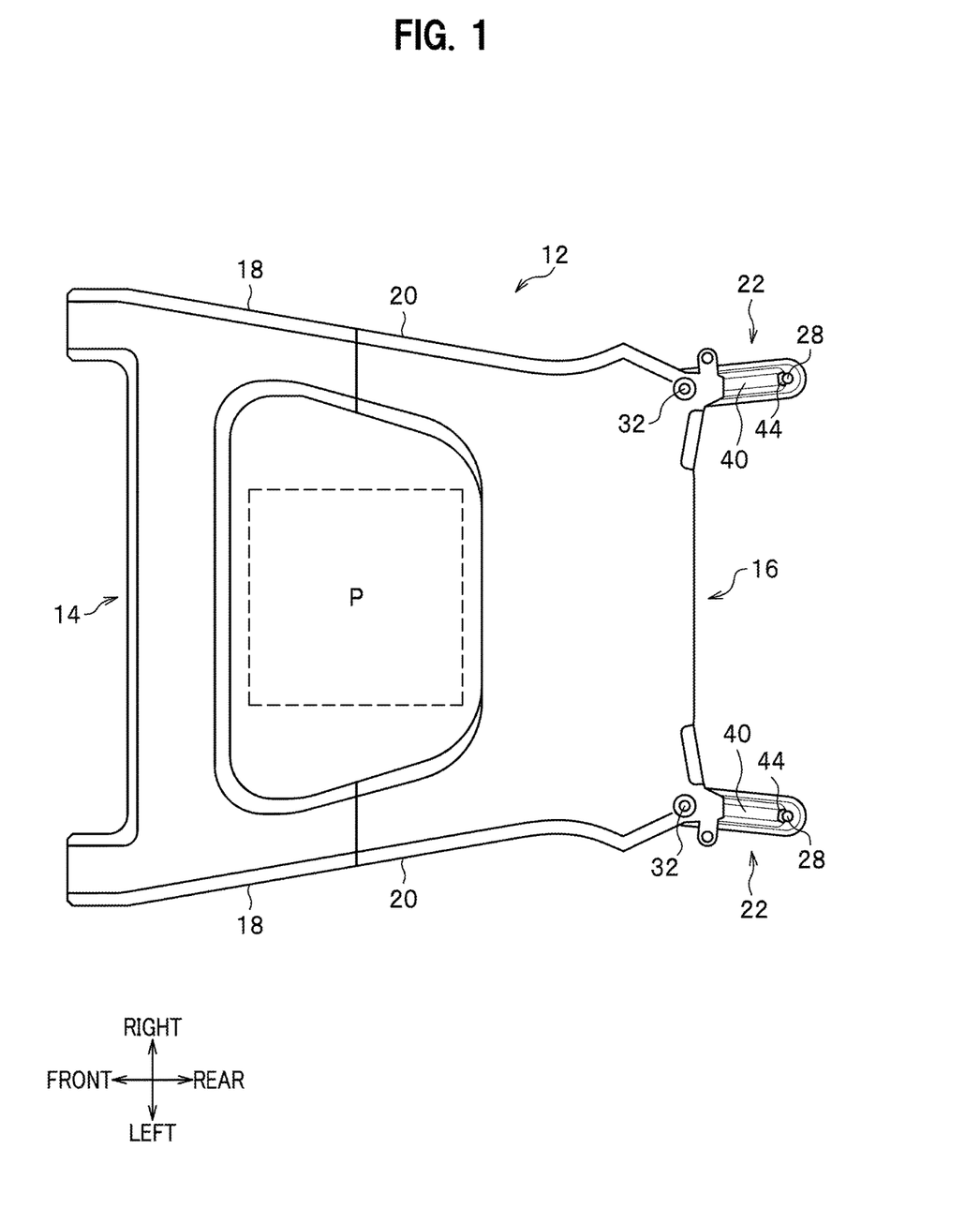
FIG. 1 is a plan view of a subframe employing a stay drop-off structure according to an embodiment of the present invention.
Figure 2:
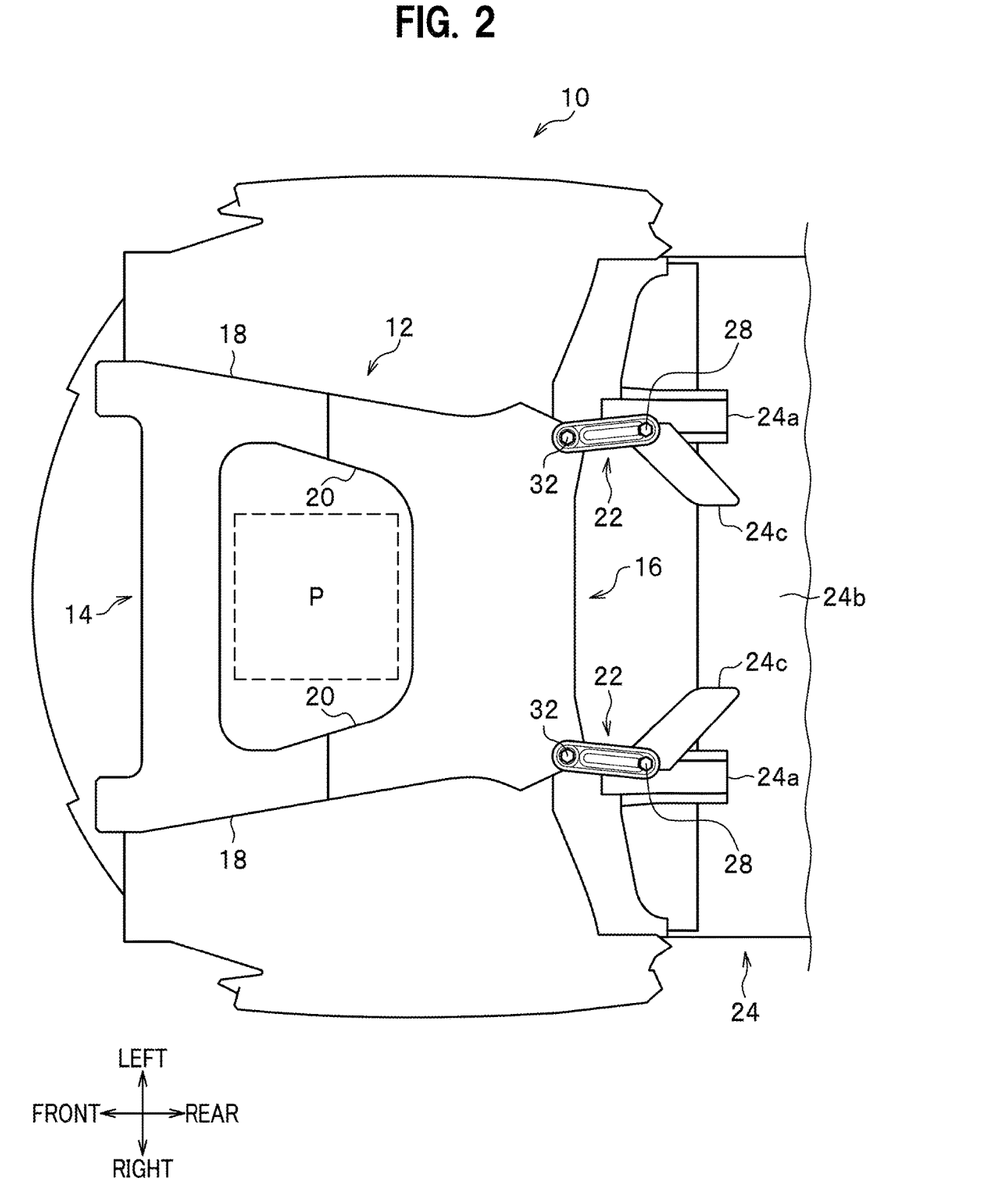
FIG. 2 is a bottom view of the subframe illustrated in FIG. 1 as viewed the bottom side.

Next, an embodiment of the present invention will be described in detail with reference to the drawings as appropriate. FIG. 1 is a plan view of a subframe employing a stay drop-off structure according to the embodiment of the present invention. FIG. 2 is a bottom view of the subframe illustrated in FIG. 1 as viewed from the bottom side. Note that in drawings, "front" and "rear" represent the vehicle front-rear direction, "left" and "right" represent the vehicle left-right direction (vehicle width direction), and "up" and "down" represent the vertical direction.

As illustrated in FIGS. 1 and 2, a subframe 12 is mounted on a front side of the vehicle body of a vehicle 10. This subframe 12 includes a front cross member 14 and a rear cross member 16. On both sides of the front cross member 14 in the vehicle width direction, front left and right side portions 18, 18 are disposed opposite to each other, the front left and right side portions 18, 18 extending toward the rear of the vehicle. On both sides of the rear cross member 16 in the vehicle width direction, rear left and right side portions 20, 20 are provided which extend toward the front of the vehicle to be coupled to the front left and right side portions 18, 18.

Note that while the case where the front left and right side portions 18, 18 and the rear left and right side portions 20, 20 are formed respectively integrally with the front cross member 14 and the rear cross member 16 as the subframe 12 is exemplarily presented in this embodiment, the present invention is not limited to this case. For example, the front left side portion 18 and the rear left side portion 20 may be shaped integrally with each other to form a left side member (not illustrated), and the front right side portion 18 and the rear right side portion 20 may be shaped integrally with each other to form a right side member (not illustrated).

The front cross member 14 extends in the vehicle width direction of the vehicle 10 and is disposed in front of a power unit P. The rear cross member 16 extends in the vehicle width direction of the vehicle 10 and is disposed behind the power unit P. In a plan view, the front left side portion 18 and the rear left side portion 20 extend in the front-rear direction of the vehicle 10 and are disposed to the left of the power unit P. In the plan view, the front right side portion 18 and the rear right side portion 20 extend in the front-rear direction of the vehicle 10 and are disposed to the right of the power unit P.

The power unit P is, for example, a unit in which an engine and a transmission are configured integrally with each other, and is disposed such that, upon application of an impact load from the front side of the vehicle body, the power unit P can drop with that impact load and its own weight by way of a pair of stays 22 to be described later.

The subframe 12 has a structure substantially in the shape of the number sign (#) in a plan view with the front and rear left and right side portions 18, 18 and 20, 20 of the front cross member 14 and the rear cross member 16 integrally fixed to each other by welding or the like, for example. Note that the subframe 12 is not limited to the structure substantially in the shape of the number sign, but may include a single cross member for the left and right side members.

The pair of stays 22, 22 are disposed on the opposite sides of the rear cross member 16 in the vehicle width direction. Each stay 22 extends from the rear cross member 16 toward the rear of the vehicle and couples a body frame (first structure) 24 and the subframe (second structure) 12 of the vehicle 10 to each other.

Figure 3A:
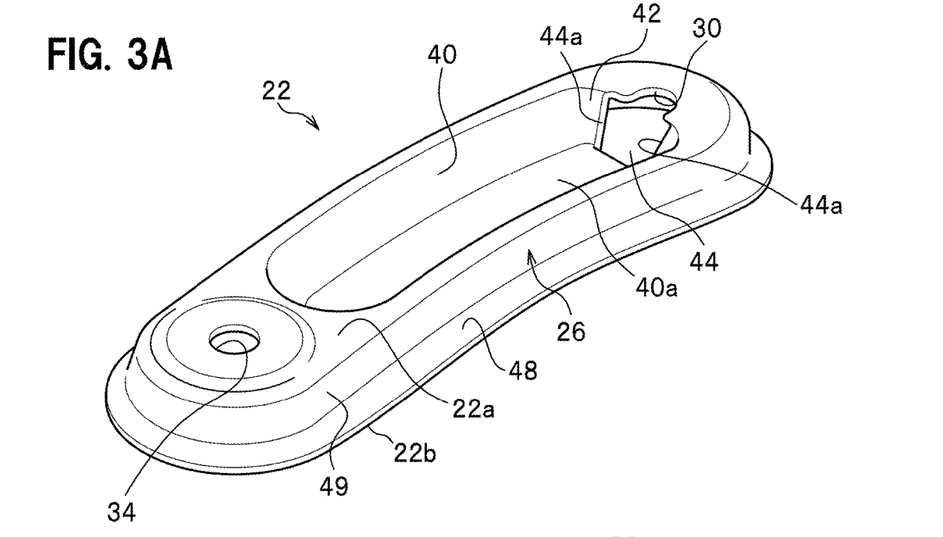
FIG. 3A is a perspective view of a stay.
Figure 3B:
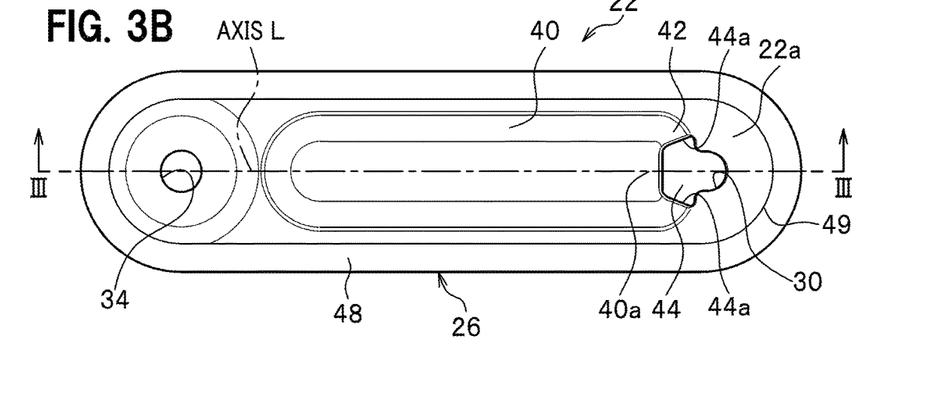
FIG. 3B is a plan view of the stay.
Figure 3C:
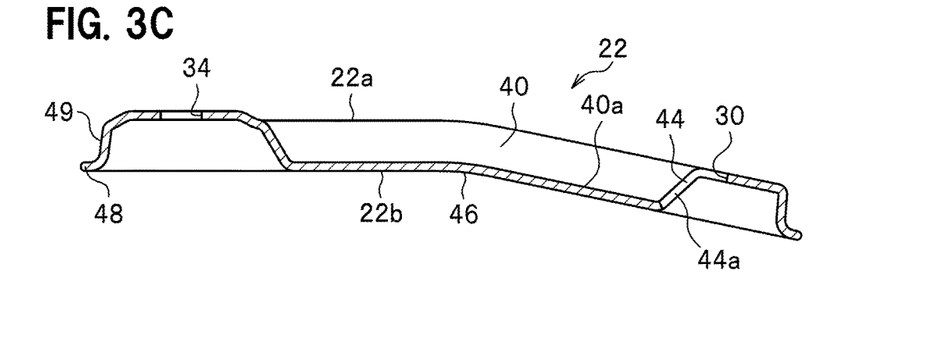
FIG. 3C is a cross-sectional view taken along the line III-III of FIG. 3B.
Figure 4:
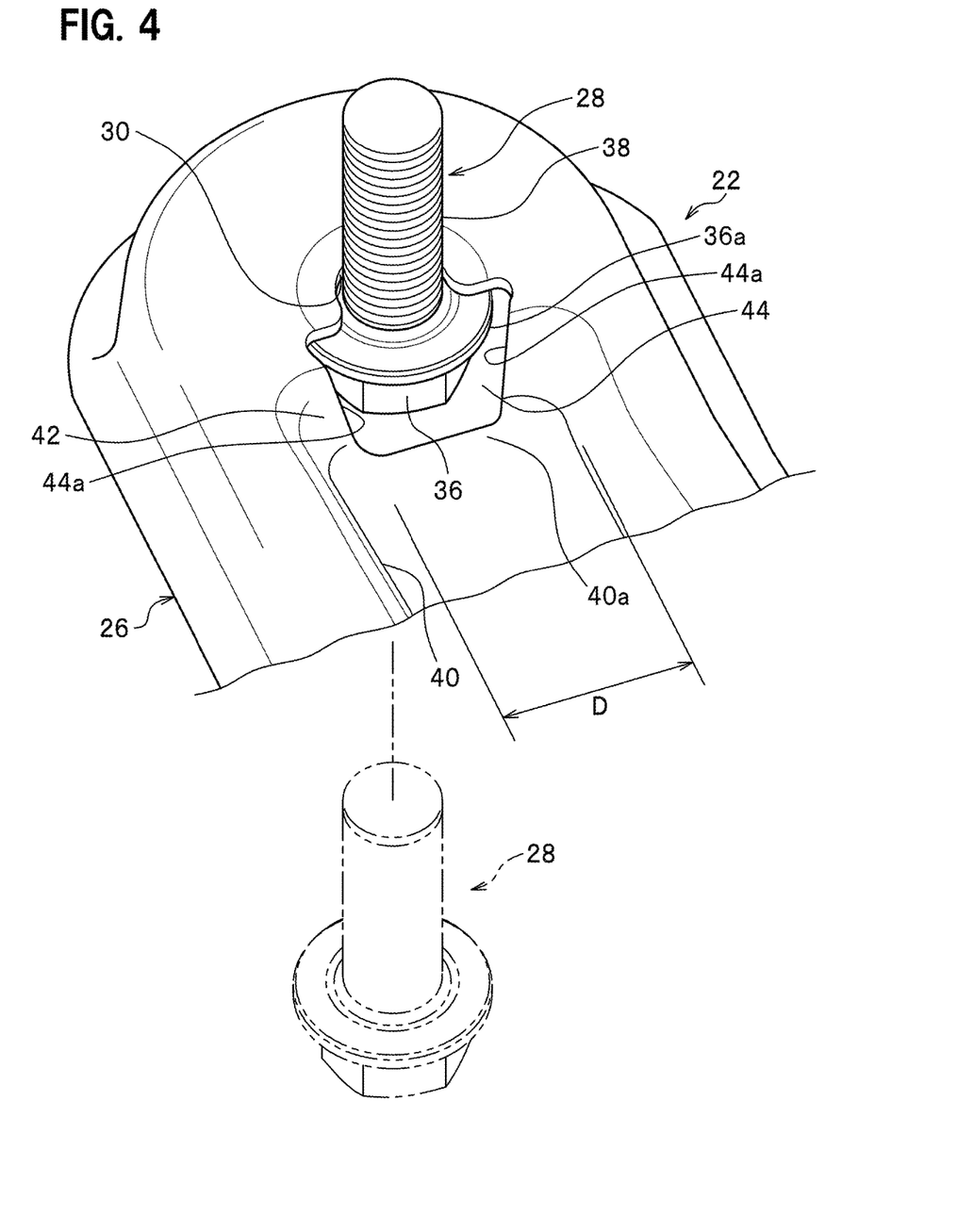
FIG. 4 is a partially enlarged perspective view illustrating a state where a first bolt is inserted through a first-bolt hole portion of the stay.

FIG. 3A is a perspective view of one of the stays, FIG. 3B is a plan view of the stay, and FIG. 3C is a cross-sectional view taken along the line III-III of FIG. 3B. FIG. 4 is a partially enlarged perspective view illustrating a state where a first bolt is inserted through a first-bolt hole portion of the stay.

This pair of stays 22, 22 are each fastened upward from the bottom side of the vehicle body by a first bolt 28 and a second bolt 32 to be described later (see FIGS. 1, 2, and 4). Note that the pair of stays 22, 22 have the same configuration. Thus, one of the stays 22, 22 will be described in detail and description of the other stay 22 will be omitted. The body frame 24 includes, for example, side frames, side sills, floor frames 24a, a floor panel 24b, outriggers 24c (see FIG. 2), and so on.

As illustrated in FIG. 3B, each stay 22 includes a stay body portion 26 having a substantially elliptical plate shape in a plan view. On one end side of the stay body portion 26 in its axial direction (the direction of an axis L in FIG. 3B), a first-bolt hole portion 30 is formed which is fastened to the body frame 24 (see FIG. 2) by the first bolt 28. On the opposite end side of the stay body portion 26 in its axial direction, a second-bolt hole portion 34 is formed which is fastened to the subframe 12 (rear cross member 16) by the second bolt 32 (see FIGS. 1 and 2).

The first bolt 28 and the second bolt 32 each include a head portion 36 having a polygonal shape in a plan view and a threaded portion 38 with an external thread carved in its outer peripheral face, and the head portion 36 and the threaded portion 38 are formed integrally with each other (see FIG. 4). The head portion 36 also includes a disc-shaped flange 36a. Note that illustration of a nut to be fastened to the threaded portion 38 of the bolt 28, 32 is omitted.

As illustrated in FIGS. 3A and 3C, between the first-bolt hole portion 30 and the second-bolt hole portion 34, a recessed portion 40 is formed which is recessed from a top face 22a of the stay body portion 26 toward a bottom face 22b thereof. This recessed portion 40 is formed in a substantially elliptical shape in a plan view from the top face 22a side of the stay body portion 26. Also, the recessed portion 40 is formed to extend in the direction of the axis of the stay body portion 26 and to be continuous with the first-bolt hole portion 30. Note that the recessed portion 40 is formed to be discontinuous with the second-bolt hole portion 34 (see FIG. 3C).

On the first-bolt hole portion 30 side of the recessed portion 40, a cutout portion (opening portion) 44 is provided which is continuous with the first-bolt hole portion 30 and formed by cutting out a part of a sidewall 42 forming the recessed portion 40. The opening formed by this cutout portion 44 is formed in a substantially trapezoidal shape whose opening width gradually decreases from the top face 22a of the stay body portion 26 toward the bottom face 22b in a plan view of the stay 22 (see FIG. 3B). Also, the cutout portion 44 is formed to be open substantially toward the front of the vehicle.

The dimension of the recessed portion 40 in its depth direction is set to be equal to or larger than the dimension of the head portion 36 of the first bolt 28 in its height direction (axial direction). Also, the widthwise dimension of the cutout portion 44 in a direction perpendicular to the axis of the stay 22 is set to be smaller than a largest outer diameter D of the head portion 36 of the first bolt 28 (see the outer diameter of the flange 36a in FIG. 4). Meanwhile, the threaded portion 38 of the first bolt 28 is inserted through the first-bolt hole portion 30 from the bottom face 22b side of the stay body portion 26 toward the top face 22a side, and the head portion 36 of the first bolt 28 contacts the first-bolt hole portion 30.

In other words, the dimension of the cutout portion 44 in its width direction is smaller than the largest outer diameter D of the head portion 36 of the first bolt 28, and the head portion 36 of the first bolt 28 is prevented from slipping out of the cutout portion 44 from outside to the recessed portion 40 side. Consequently, the first bolt 28 remains fastened to the first-bolt hole portion 30, so that the first bolt 28 holds the body frame 24 and the subframe 12 of the vehicle 10 coupled to each other.

As illustrated in FIG. 3C, a bent portion 46 bent in a substantially inverted V-shape is provided substantially at the center of the stay 22 in its axial direction. This bent portion 46 is provided according to the positional relation (relation in the vertical direction) between the point on the one end side at which the first bolt 28 is fastened and the point on the opposite end side at which the second bolt 32 is fastened.

A flange portion 48 is provided along the entity of the substantially elliptical periphery of the stay 22. A bulging portion 49 is formed inward of the flange portion 48, the bulging portion 49 rising upward from the flange portion 48. The recessed portion 40 is disposed inward of the bulging portion 49.

The vehicle 10, employing the stay drop-off structure according to this embodiment, is basically configured as described above. Next, its operation and advantageous effects will be described.

In a normal state, i.e. in a state where the first bolt 28 and the second bolt 32 are fastened to the first-bolt hole portion 30 and the second-bolt hole portion 34 respectively and the body frame 24 and the subframe 12 are coupled to each other by each stay 22 (see FIG. 6A to be mentioned later), the first bolt 28 is prevented from slipping out of the first-bolt hole portion 30 and being displaced to the recessed portion 40 side even if the axial force of the first bolt 28, which fastens the stay 22 and the body frame 24 to each other, has decreased.

Specifically, in this embodiment, the dimension of the recessed portion 40 in its depth direction is set to be equal to or larger than the dimension of the head portion 36 of the first bolt 28 in its height direction (axial direction), and the widthwise dimension of the cutout portion 44 in a direction perpendicular to the axis of the stay 22 (direction perpendicular to the axis L) is set to be smaller than the largest outer diameter D of the head portion 36 of the first bolt 28. In this way, the head portion 36 of the first bolt 28 is obstructed by the cutout portion 44 and positioned outside the recessed portion 40, and therefore prevented from entering the recessed portion 40.

As a result, in this embodiment, the threaded portion 38 of the first bolt 28 is held and remains inside the first-bolt hole portion 30 and the stay 22 can thus be prevented from dropping from the vehicle body even in events other than input of an impact load F to the vehicle 10 such as decrease in the axial force of the first bolt 28, fastening the stay 22 and the body frame 24 to each other.

Figure 5A:
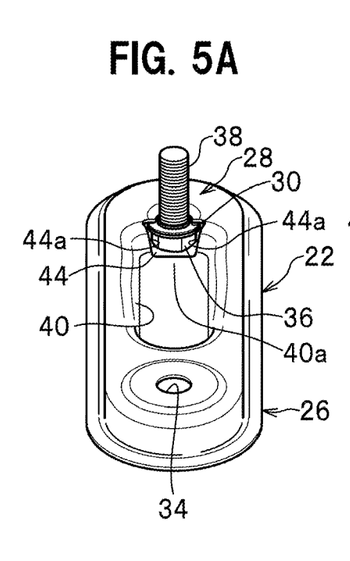
FIGS. 5A to 5D are perspective views each illustrating a state where a cutout portion is deformed to be widened and a bolt enters a recessed portion when an impact load F is input.
Figure 5B:
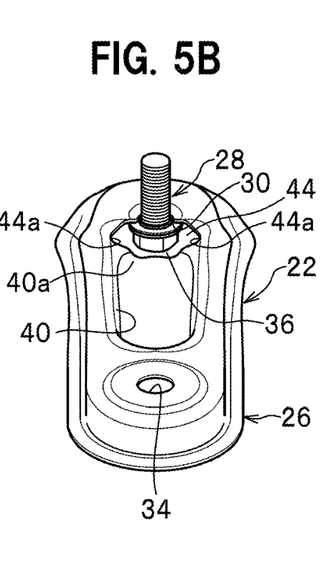

FIGS. 5A to 5D are perspective views each illustrating a state where the cutout portion is deformed to be widened and the bolt enters the recessed portion when the impact load F is input. FIG. 6A is a partially broken side view illustrating a state before the impact load F is input, and FIGS. 6B and 6C are partially broken side views each illustrating a state where the stay becomes separated from the body frame when the impact load F is input. Meanwhile, in FIGS. 6A to 6C, reference numeral 50 denotes a side frame (body frame), and reference numeral 52 denotes a side sill. Also, FIGS. 5A and 6A illustrate the normal state before the application of the impact load F.

When the impact load F is input to the front of the vehicle 10 in, for example, a front collision or the like (assuming a frontal collision of the vehicle 10 with an object substantially evenly over its entire width), the impact load F is transmitted to the left and right side frames 50, 50 (only the left side frame 50 is illustrated in FIGS. 6A to 6C) through a front bumper not illustrated. The left and right side frames 50, 50 are equally crushed by the impact load F. Following the left and right side frames 50, 50, the subframe 12 is displaced toward the rear of the vehicle (toward a dashboard not illustrated).

The force pushing the subframe 12 toward the rear of the vehicle is transmitted to each stay 22 (see FIG. 6B). The stay body portion 26 of the stay 22 is therefore pushed toward the rear of the vehicle, so that the stay 22 is deformed to bend in a direction perpendicular to the axis of the stay 22 at a boundary portion between the cutout portion 44, serving as a fragile portion, and a recessed-portion bottom face 40a (see FIG. 5B). Simultaneously, the head portion 36 of the first bolt 28 contacts inner walls 44a of the cutout portion 44 and deforms the inner walls 44a such that the head portion 36 of the first bolt 28 can pass through the cutout portion 44.

Figure 5C:
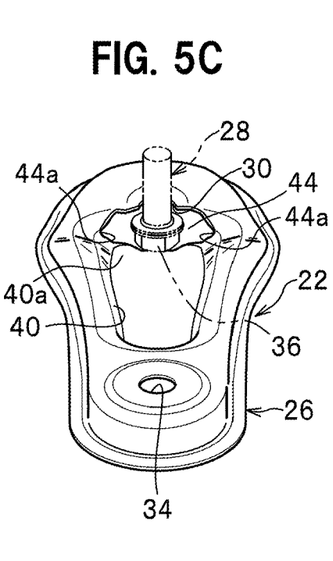
Figure 6A:
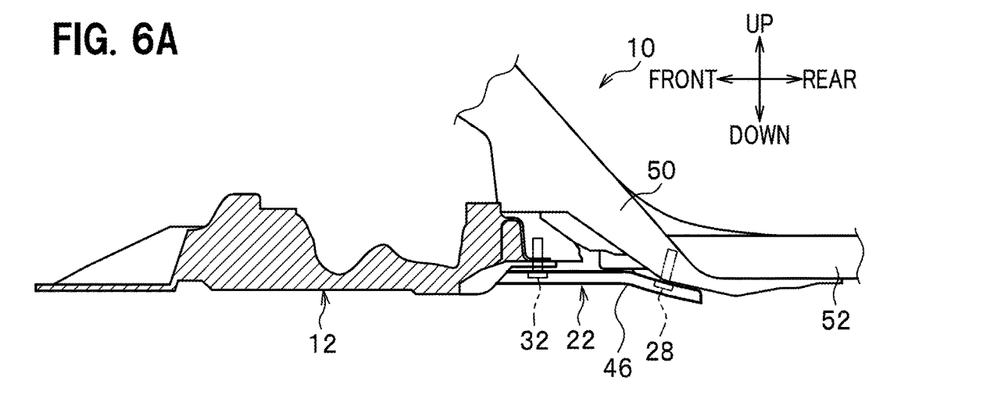
FIG. 6A is a partially broken side view illustrating a state before the impact load F is input.
Figure 6B:
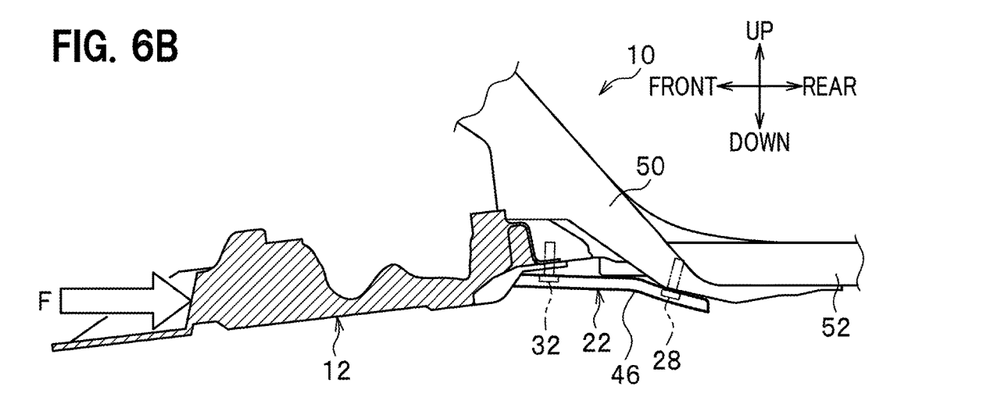
FIGS. 6B and 6C are partially broken side views each illustrating a state where the stay becomes separated from a body frame when the impact load F is input.
Figure 6C:
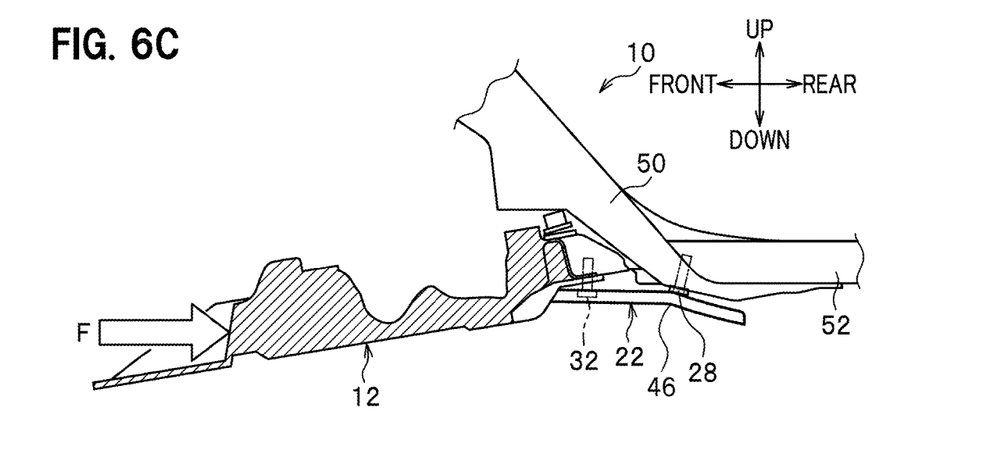

Consequently, in this embodiment, the dimension of the cutout portion 44 in its width direction is enlarged (widened), so that the threaded portion 38 of the first bolt 28 becomes separated from the first-bolt hole portion 30 and the head portion 36 of the first bolt 28 passes through the cutout portion 44 and enters the recessed portion 40 (see FIG. 5C). Note that the first bolt 28 is assumed to remain fastened to the body frame 24 and the second bolt 32 is assumed to remain fastened to the subframe 12 (see FIG. 6B).

In this embodiment, the one end of the stay 22, including the first-bolt hole portion 30, is slid toward the rear of the vehicle, so that the one end of the stay 22, including the first-bolt hole portion 30, becomes separated from the first bolt 28 (see FIG. 6C). As a result, in this embodiment, the subframe 12, now separated from the side frame 50, and the power unit P, elastically supported on the subframe 12, are caused to drop.

As described above, in this embodiment, in the normal state, the widthwise dimension of the cutout portion 44 in a direction perpendicular to the axis of the stay 22 is set to be smaller than the largest outer diameter of the head portion 36 of the first bolt 28, thereby preventing the head portion 36 of the first bolt 28 from entering the recessed portion 40. In other words, in the normally fastened state, the cutout portion 44 restricts the threaded portion 38 of the first bolt 28 from becoming separated from the first-bolt hole portion 30. Hence, the threaded portion 38 of the first bolt 28 stays inside the first-bolt hole portion 30 and remains fastened.

Figure 5D:
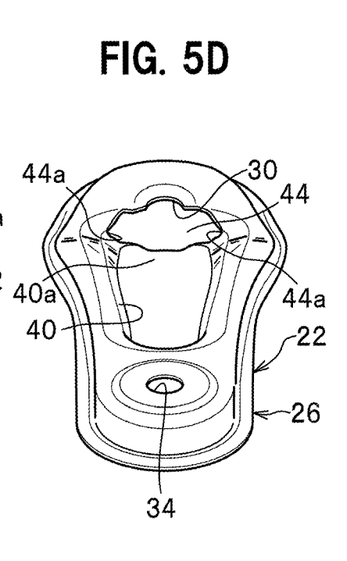

On the other hand, upon, for example, input of the impact load F to the front of the vehicle 10, the cutout portion 44, serving as a fragile portion, is deformed such that the widthwise dimension of the cutout portion 44 becomes larger than the largest outer diameter D of the head portion 36 of the first bolt 28, and the head portion 36 of the first bolt 28 passes through the cutout portion 44 from outside and enters the recessed portion 40 (see FIG. 5D). As a result, the one end of the stay 22, including the first-bolt hole portion 30, drops from the first bolt 28 (see FIG. 5D).

Thus, in this embodiment, it is possible to reliably cause the subframe 12 and the power unit P to drop from the vehicle body upon input of the impact load F in a collision, while preventing the subframe 12 and the power unit P from dropping due to factors other than input of the impact load F that originate from, for example, decrease in the axial force of the first bolt 28 and the second bolt 32 resulting from loosening of these bolts and the like.

Further, in this embodiment, the cutout portion 44, formed in the recessed portion 40, is open substantially toward the front of the vehicle 10 (see FIG. 1). In this way, the inner walls 44a of the cutout portion 44 can be easily deformed to be widened by the impact load F input from the front of the vehicle 10. As a result, upon input of the impact load F to the vehicle 10, the head portion 36 of the first bolt 28 can smoothly and easily pass through the cutout portion 44.

Next, this embodiment will be described in detail by comparing it with comparative examples.

Figure 7A:
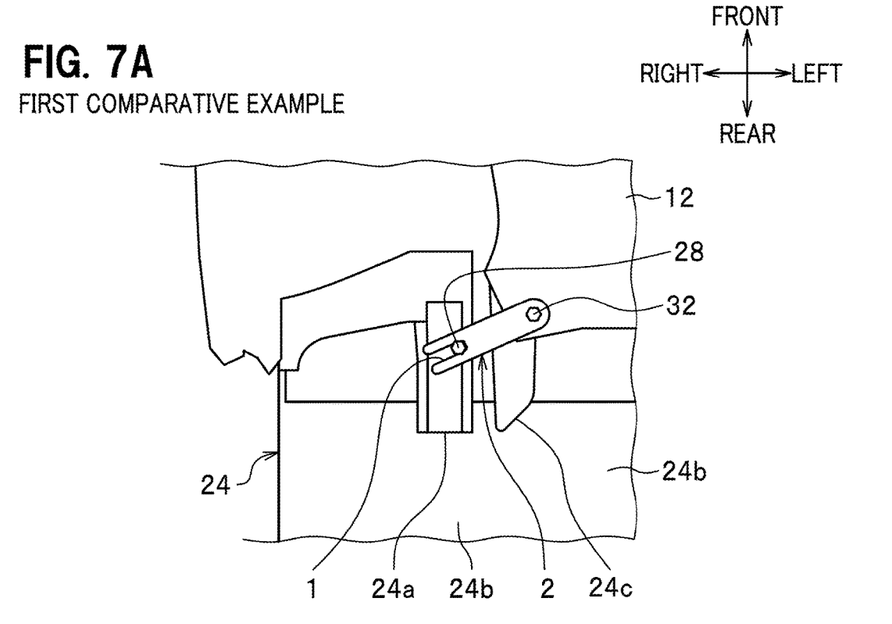
FIG. 7A is a bottom view illustrating a first comparative example made by the applicant by employing the stay drop-off structure disclosed in Japanese Patent No. 3954477.
Figure 7B:
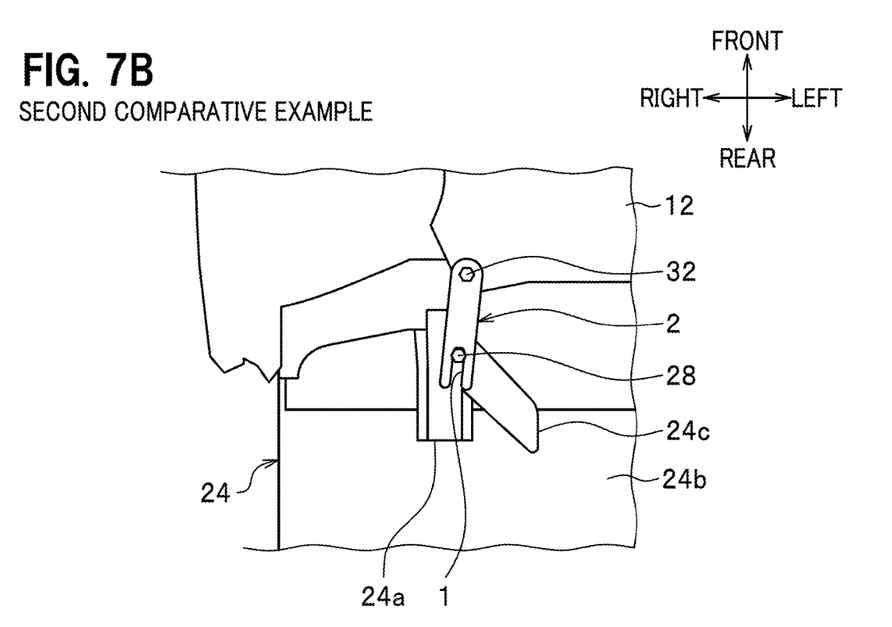
FIG. 7B is a bottom view illustrating a second comparative example made by the applicant by employing the stay drop-off structure disclosed in Japanese Patent No. 3954477.

FIG. 7A is a bottom view illustrating a first comparative example made by the applicant by employing the stay drop-off structure disclosed in Japanese Patent No. 3954477. FIG. 7B is a bottom view illustrating a second comparative example made by the applicant by employing the stay drop-off structure disclosed in Japanese Patent No. 3954477. Note that in the first comparative example and the second comparative example, stays 2 each including a slit 1 at one end are used. Other constituent elements identical or substantially identical to those in this embodiment will be described with the identical reference numerals given thereto.

In the first comparative example, each stay 2, including a slit 1, is disposed substantially along the vehicle width direction. One end of the stay 2 is fastened to a floor frame 24a by a first bolt 28. The opposite end of the stay 2 is fastened to a subframe 12 and an outrigger 24c by a second bolt 32.

In the first comparative example, illustrated in FIG. 7A, it is possible to improve the rigidity and strength of the coupling of the subframe 12 to the body frame 24 (such as the floor frame 24a and floor panel 24b) side, and also cause the stay 2 to drop (separate) from the first bolt 28 through the slit 1 in events such as a collision of the vehicle.

In the first comparative example, however, it is difficult to improve rigidity and strength against a mechanical input (e.g. the impact load F in a collision of the vehicle) in the vehicle front-rear-direction transmitted from the subframe 12 side to the body frame 24 side (or in the opposite direction from the body frame 24 side to the subframe 12 side) by using the stay 2. This is because the direction in which the mechanical input in the vehicle front-rear direction is applied to the stay 2 and the direction in which the stay 2 is displaced along the slit 1 are substantially perpendicular to each other and it is difficult for the stay 2 to be displaced away from the first bolt 28 through the slit 1 in a direction for dropping.

In second comparative example, each stay 2, including a slit 1, is disposed along the vehicle front-rear direction. One end of the stay 2 is fastened to a floor frame 24a and an outrigger 24c by a first bolt 28. The opposite end of the stay 2 is fastened to a subframe 12 by a second bolt 32.

In the second comparative example, illustrated in FIG. 7B, it is possible to improve the rigidity and strength of the coupling of the subframe 12 to the body frame 24 (such as the floor frame 24a and floor panel 24b) side. At the same time, it is also possible to improve rigidity and strength against a mechanical input (e.g. the impact load F applied in a collision of the vehicle) in the vehicle front-rear direction transmitted from the subframe 12 side to the body frame 24 side (or in the opposite direction from the body frame 24 side to the subframe 12 side). In the second comparative example, however, the stay 2 may possibly fail to drop from the first bolt 28 through the slit 1 in a collision of the vehicle.

As described above, in the first comparative example and the second comparative example, made by the applicant by employing the stay drop-off structure disclosed in Japanese Patent No. 3954477, it may be difficult to achieve both improvement in rigidity and strength against a mechanical input (e.g. the impact load F applied in a collision of the vehicle) in the vehicle front-rear direction transmitted from the subframe 12 side to the body frame 24 side (or in the opposite direction from the body frame 24 side to the subframe 12 side), and dropping of the stay 2 from the first bolt 28 through the slit 1 in a collision of the vehicle.

In contrast, with the stay drop-off structure according to this embodiment, it is possible to suitably achieve both improvement in rigidity and strength against a mechanical input (e.g. the impact load F applied in a collision of the vehicle) in the vehicle front-rear direction transmitted from the subframe 12 side to the body frame 24 side (or in the opposite direction from the body frame 24 side to the subframe 12 side), and dropping of the stay 22 from the body frame 24 in a collision of the vehicle by letting the cutout portion 44, serving as a fragile portion, be deformed and allowing the head portion 36 of the first bolt 28 to pass through the cutout portion 44 and enter the recessed portion 40.

What is claimed is:

1. A stay drop-off structure in case of impact load input for causing a stay to drop from a first structure or a second structure of a vehicle upon input of an impact load into the vehicle, the first structure and the second structure being coupled to each other by the stay, wherein
the stay includes
a first-bolt hole portion situated on one end side of the stay in an axial direction thereof and fastened to the first structure by a first bolt,
a second-bolt hole portion situated on an opposite end side of the stay in the axial direction and fastened to the second structure by a second bolt,
a recessed portion disposed between the first-bolt hole portion and the second-bolt hole portion and recessed downward, and
a cutout portion being continuous with the first-bolt hole portion and formed by cutting out apart of the recessed portion,
a dimension of the recessed portion in a depth direction thereof is equal to or larger than a dimension of a head portion of the first bolt in a height direction thereof,
a widthwise dimension of the cutout portion in a direction perpendicular to an axis of the stay is set to be smaller than a largest outer diameter of the head portion of the first bolt, and
the head portion of the first bolt is provided such that, when an impact load is input to the vehicle, the head portion of the first bolt is capable of passing through the cutout portion deformed by the input of the impact load and entering the recessed portion.

2. The stay drop-off structure in case of impact load input according to claim 1, wherein the cutout portion is open substantially toward a front of the vehicle.

3. The stay drop-off structure in case of impact load input according to claim 1, wherein
the first structure is a body frame of the vehicle, and
the second structure is a subframe of the vehicle.

4. The stay drop-off structure in case of impact load input according to claim 2, wherein
the first structure is a body frame of the vehicle, and
the second structure is a subframe of the vehicle.

* * * * *